US012657081B2

(12) United States Patent
Mishra et al.

(10) Patent No.: US 12,657,081 B2
(45) Date of Patent: Jun. 16, 2026

(54) SYSTEM AND METHOD FOR ONLINE MACHINE ISSUE RESOLUTION USING LIVE KERNEL DUMP FILE ANALYSIS

(71) Applicant: Microsoft Technology Licensing, LLC, Redmond, WA (US)

(72) Inventors: Binit Ranjan Mishra, Kenmore, WA (US); Vaybhav Shaw, Seattle, WA (US); Miles Richard Wallio, Lake Stevens, WA (US); Chantale Ninah, Seattle, WA (US); Siamak Ahari, Seattle, WA (US); Haitao Wang, Sammamish, WA (US); Gaurav Jagtiani, Kirkland, WA (US); Rajeev Prabhu Acharya, Redmond, WA (US); Emma Sutherland Montalvo, Richmond, VA (US); Deepak Anand Venkatesh, Los Angeles, CA (US); Alvina Prima Putri, Los Angeles, CA (US); Andrew Leslie Richards, Sammamish, WA (US); Prashant Ramakrishna Tanksali, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 22 days.

(21) Appl. No.: 18/646,129

(22) Filed: Apr. 25, 2024

(65) Prior Publication Data

US 2025/0335286 A1 Oct. 30, 2025

(51) Int. Cl.
*G06F 11/07* (2006.01)

(52) U.S. Cl.
CPC ........ *G06F 11/0778* (2013.01); *G06F 11/079* (2013.01); *G06F 11/0793* (2013.01)

(58) Field of Classification Search
CPC . G06F 11/0778; G06F 11/079; G06F 11/0793
See application file for complete search history.

(56) References Cited

U.S. PATENT DOCUMENTS

| | | | | | |
|---|---|---|---|---|---|
| 5,696,897 | A | * | 12/1997 | Dong | .................... G06F 9/4418 |
| | | | | | 714/24 |
| 9,354,962 | B1 | * | 5/2016 | Dong | .................... G06F 11/079 |
| 2008/0209264 | A1 | * | 8/2008 | Morse | ................. G06F 11/0778 |
| | | | | | 714/6.32 |
| 2017/0192831 | A1 | | 7/2017 | Abrams et al. | |
| 2020/0327046 | A1 | * | 10/2020 | Rizvi | .................. G06F 11/3692 |

OTHER PUBLICATIONS

Extended European Search Report received in European Patent Application No. 25170340.1, mailed on Oct. 2, 2025, 10 pages.

* cited by examiner

*Primary Examiner* — Bryce P Bonzo
*Assistant Examiner* — Audrey Emma Whitesell

(57) ABSTRACT

A method, computer program product, and computing system for detecting, using an agent, an issue associated with a target computing device. A kernel dump file is obtained by initiating a kernel dump concerning the issue from the target computing device to the agent. A flagged kernel dump file is generated by flagging the kernel dump file for prioritized processing on an agent processing queue. The flagged kernel dump file is queued in a prioritized kernel dump queue. The flagged kernel dump file is uploaded from the prioritized kernel dump queue to an analysis server for online resolution.

17 Claims, 4 Drawing Sheets

10

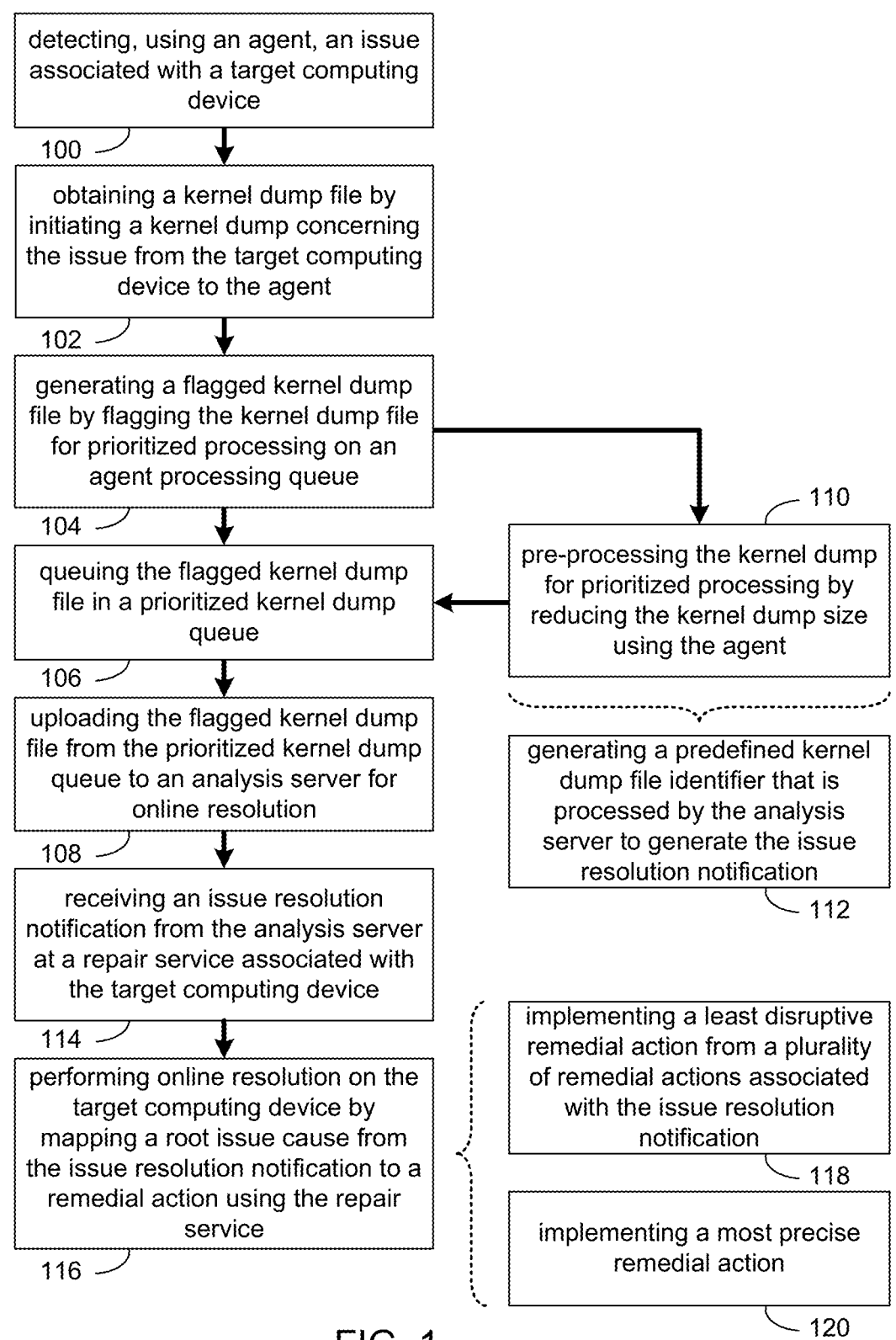

detecting, using an agent, an issue associated with a target computing device

100 obtaining a kernel dump file by initiating a kernel dump concerning the issue from the target computing device to the agent

102 generating a flagged kernel dump file by flagging the kernel dump file for prioritized processing on an agent processing queue

104 queuing the flagged kernel dump file in a prioritized kernel dump queue

106 uploading the flagged kernel dump file from the prioritized kernel dump queue to an analysis server for online resolution

108 receiving an issue resolution notification from the analysis server at a repair service associated with the target computing device

114 performing online resolution on the target computing device by mapping a root issue cause from the issue resolution notification to a remedial action using the repair service

116

110 pre-processing the kernel dump for prioritized processing by reducing the kernel dump size using the agent generating a predefined kernel dump file identifier that is processed by the analysis server to generate the issue resolution notification

112 implementing a least disruptive remedial action from a plurality of remedial actions associated with the issue resolution notification

118 implementing a most precise remedial action

SYSTEM AND METHOD FOR ONLINE MACHINE ISSUE RESOLUTION USING LIVE KERNEL DUMP FILE ANALYSIS

BACKGROUND

In a cloud computing environment, physical computing devices are used to host virtual machines and other services that are managed by various users of the cloud computing environment. However, these physical computing devices are vulnerable to issues that can impact the performance of virtual machines and services supported by the physical computing device. Accordingly, such issues may be detected and processed offline to resolve similar problems in the same or other computing devices in the future.

However, this can lead to situations where, in response to detecting an issue with a physical computing device, the physical computing device is subject to an unexpected reboot resulting in periods of virtual machine unavailability by users. Extended virtual machine downtime can lead to cloud service outages, revenue loss, and negative user experiences with the impacted cloud computing environment. Additionally, physical computing devices may have any deployed virtual machines moved to another physical computing device in order to diagnose the issues offline.

BRIEF DESCRIPTION OF THE DRAWINGS

FIG. 1 is a flow chart of one implementation of an online machine issue resolution process;

Like reference symbols in the various drawings indicate like elements.

DETAILED DESCRIPTION OF THE EMBODIMENTS

Figure 2:
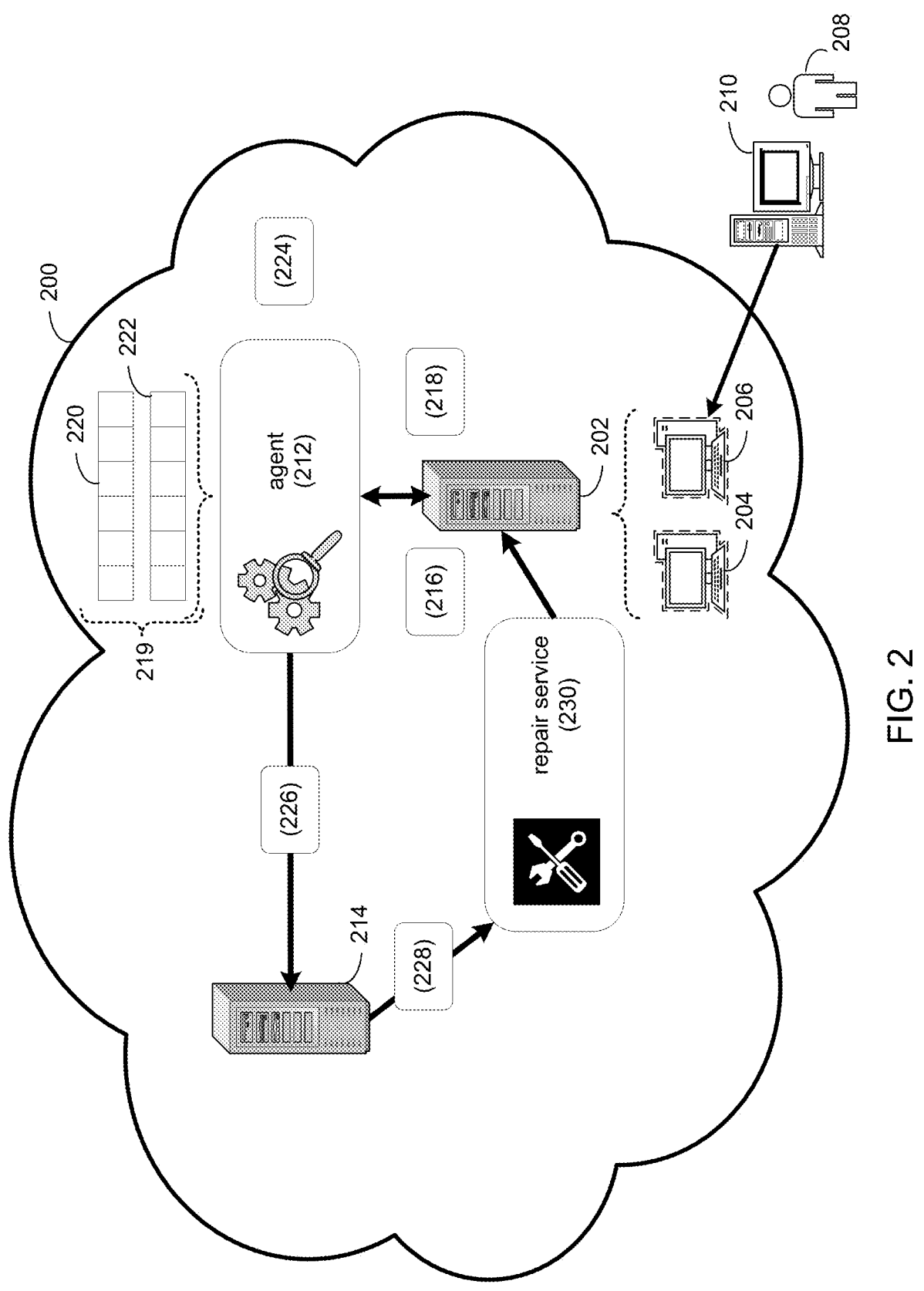
FIGS. 2-3 are diagrammatic views of the online machine issue resolution process of FIG. 1.

Implementations of the present disclosure enable the analyzing of live kernel dumps (LKDs) in near-real time to inform virtual machine online recovery about the root cause of an issue experienced by a target computing device by expediting the processing and transmission of live kernel dumps from the target computing device to an analysis server and performing the least disruptive remedial action(s) based on the response from the analysis server. Other solutions generally collect live kernel dumps during an issue repair workflow that resolves issues for a target computing device that cannot be stopped, nor can any deployed virtual machines be deleted or removed. These approaches take around 26 minutes from the start of live kernel dump collection until the end of the issue resolution workflow. These results are only used for offline failure attribution and these diagnostics do not benefit the customer in real-time.

As will be described in greater detail below, implementations of the present disclosure detect, using an agent, an issue associated with a target computing device. An agent is a hardware and/or software system that interacts with a target computing device to monitor the operation of the target computing device itself and any issues with the deployment of virtual machines and/or other services within a cloud computing environment provided by the target computing device. As discussed above, the target computing device may be a physical computing device with various virtual machines and/or other services deployed within a cloud computing environment. The agent may detect issues associated with the operation of the virtual machines and/or the target computing device itself that can impact or degrade the performance of the target computing device. A kernel dump file is obtained by initiating a kernel dump concerning the issue from the target computing device to the agent. A kernel dump file is a snapshot of the target computing device's memory at a specific point in time and is generated when a serious issue is encountered or detected. Using the kernel dump file, an analysis server can diagnose the issue. However, conventional approaches to managing these live kernel dump files are limited to offline processing due to the low processing priority and large file sizes associated with kernel dump files.

Accordingly, implementations of the present disclosure flag the kernel dump file for prioritized processing on an agent processing queue. The flagged kernel dump file is queued in a prioritized kernel dump queue for expedited processing and transmitting to the analysis server. The flagged kernel dump file is processed for transmitting by compressing and/or encoding the flagged kernel dump file. This pre-processing of the flagged kernel dump file may include reducing the kernel dump size using the agent and/or generating a predefined kernel dump file identifier that is processed by the analysis server to generate an issue resolution notification describing the issue and remedial actions to resolve the issue. The flagged kernel dump file is uploaded from the prioritized kernel dump queue to an analysis server for online resolution (i.e., resolving the issue in near-real time in response to detecting the issue as opposed to offline resolution after demands on the target computing device are removed or delayed).

The analysis server processes the flagged kernel dump file to generate an issue resolution notification describing the issue and remedial actions to resolve the issue. The issue resolution notification is transmitted to and received by a repair service associated with the target computing device. The repair service is a hardware and/or software system that interacts with a target computing device to implement various repair procedures to configure and maintain the target computing device for deploying virtual machines and/or other services within a cloud computing environment. The repair service performs online resolution on the target computing device by implementing the issue resolution notification on the target computing device using a least disruptive remedial action from a plurality of disruptive remedial actions associated with the issue resolution notification. In this manner, the process of collecting live kernel dump files and issue resolution notification processing is reduced to about three minutes instead of 26 minutes. Accordingly, any amount of virtual machine or other deployed service downtime is significantly reduced.

The details of one or more implementations are set forth in the accompanying drawings and the description below. Other features and advantages will become apparent from the description, the drawings, and the claims.

Figure 3:
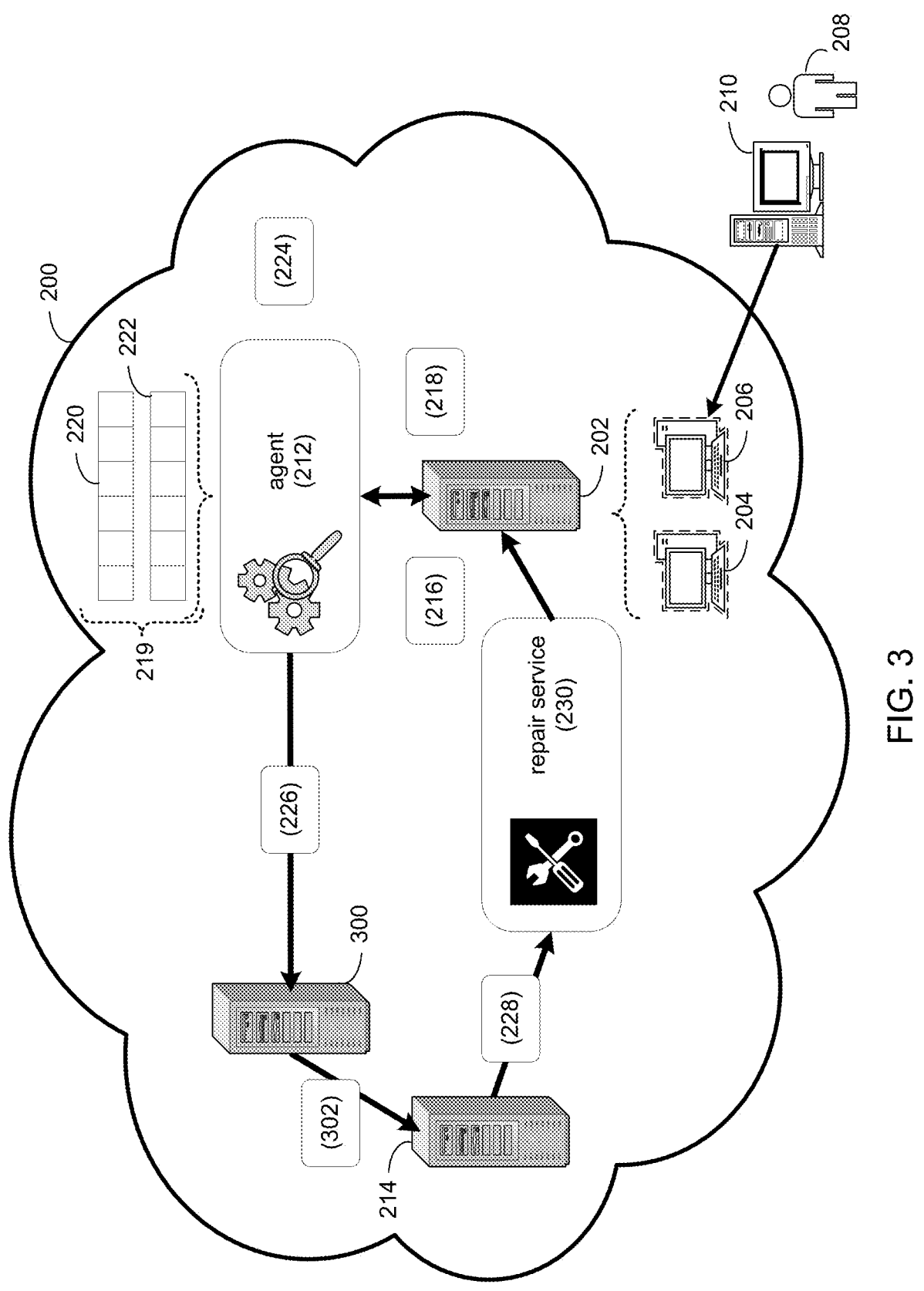

The Online Machine Issue Resolution Process:

Referring to FIGS. 1-3, online machine issue resolution process 10 detects 100, using an agent, an issue associated with a target computing device. A kernel dump file is obtained 102 by initiating a kernel dump concerning the issue from the target computing device to the agent. A flagged kernel dump file is generated 104 by flagging the kernel dump file for prioritized processing on an agent processing queue. The flagged kernel dump file is queued 106 in a prioritized kernel dump queue. The flagged kernel dump file is uploaded 108 from the prioritized kernel dump queue to an analysis server for online resolution.

In some implementations, online machine issue resolution process 10 detects 100, using an agent, an issue associated with a target computing device. Referring also to FIG. 2, a cloud computing environment (e.g., cloud computing environment 200) includes a network of remote servers and other computing devices that store, manage, and process data. Cloud computing environment 200 provides on-demand access to computing resources like servers, storage databases, networking components, software, virtual machines, services, and more using various dedicated computing devices. In one example, cloud computing environment 200 includes a target computing device (e.g., target computing device 202) that acts as host machine for deploying various virtual machines and/or other services. For example, target computing device 202 includes physical hardware that is managed by a hypervisor to allocate resources from the target computing device to create, modify, and remove virtual machines within the cloud computing environment.

As shown in FIG. 2, target computing device 202 is shown deploying two virtual machines (e.g., virtual machines 204, 206) that is accessible to users (e.g., user 208 using computing device 210) of cloud computing environment 200. As discussed above, target computing device 202 may be subject to various issues. Accordingly, online machine issue resolution process 10 detects 100, using an agent (e.g., agent 212), an issue associated with target computing device 202. Agent 212 is a hardware and/or software system that monitors the performance of target computing device 202 for issues. For example, agent 212 collects monitoring data from the operating system of target computing device 202 and hybrid virtual machines (e.g., virtual machines 204, 206) and delivers it to an analysis server (e.g., analysis server 214) for further processing and/or issue resolution. In some implementations, agent 212 detects 100 an issue associated with target computing device 202 by comparing performance characteristics associated with target computing device 202 and/or virtual machines 204, 206 based on data collection rules. For example, data collection rules define conditions for collecting data using agent 212 from target computing device 202. In some implementations, agent 212 periodically collects data from target computing device 202 (where the data collection periodicity is user-defined or a default period of time) and processes the received data to detect 100 an issue. In some implementations, online machine issue resolution process 10 detects 100 an issue by receiving an issue alert generated by target computing device 202. Accordingly, online machine issue resolution process 10 processes the received data and/or the issue alert to determine when to initiate a live kernel dump concerning an issue associated with target computing device 202.

In some implementations, the issue includes an issue associated with a virtual machine deployed on the target computing device within a cloud computing environment. For example and as discussed above, virtual machines 204, 206 are allocated resources from target computing device 202. However, when issues occur on the underlying target computing device, virtual machines 204, 206 may experience performance degradation and/or unavailability. For example, issues that online machine issue resolution process 10 detects 100 using agent 212 include: kernel panic when the operating system of target computing device 202 detects a fatal, non-recoverable error; hardware failure from malfunctioning hardware (e.g., RAM, CPU, storage devices, and/or peripherals); software or driver failures causing instability (e.g., null pointer dereferences, buffer overflows, infinite loops, etc.); resource exhaustion from running out of memory and/or kernel queue space; security exploits including malicious software or attacks that destabilize the operating system and/or kernel of target computing device 202; power failures within target computing device; and/or software-based conflicts within target computing device 202 that interfere with virtual machines 204, 206. Accordingly, online machine issue resolution process 10 detects 100 these and other issues associated with virtual machines and/or target computing device to initiate a live kernel dump concerning the issue for online resolution.

In some implementations, online machine issue resolution process 10 obtains 102 a kernel dump file by initiating a kernel dump concerning the issue from the target computing device to the agent. For example, suppose agent 212 detects an issue associated with target computing device 202 and/or virtual machines 204, 206. In this example, agent 212 sends a kernel dump initiation command (e.g., kernel dump initiation command 216) to target computing device 202 to provoke target computing device 202 to generate and provide a kernel dump file (e.g., kernel dump file 218). As discussed above, a kernel dump file is a snapshot of the target computing device's memory at a specific point in time and is generated when a serious issue is encountered or detected. In this example, kernel dump file 218 is generated in response to target computing device 202 receiving and processing kernel dump initiation command 216 from agent 212.

In some implementations, online machine issue resolution process 10 generates 104 a flagged kernel dump file by flagging the kernel dump file for prioritized processing on an agent processing queue. For example, agent processing queue (e.g., agent processing queue 219) includes one or more kernel dump queues for storing and processing kernel dump queues (e.g., a standard kernel dump queue and a prioritized kernel dump queue). In some implementations, online machine issue resolution process 10 flags kernel dump file 218 for prioritized processing on agent 212 using a prioritized kernel dump queue (e.g., prioritized kernel dump queue 220). The flagging of kernel dump file 218 includes adding or appending a flag or other indicator (e.g., a predefined number or pattern of bits, bytes, and/or characters) to kernel dump file 218. Accordingly, agent 212 prioritizes the processing and transmitting of flagged kernel dump file 226 based upon, at least in part, the flag generated for kernel dump file 218.

In some implementations, online machine issue resolution process 10 pre-processes 110 the kernel dump file for prioritized processing by reducing the kernel dump size using the agent. For example, one of the primary challenges with quickly processing and transmitting a kernel dump file from an agent to an analysis server for online issue resolution is the significant size of the kernel dump file. Accordingly, online machine issue resolution process 10 pre-processes 110 kernel dump file 218 by compressing and/or encoding kernel dump file 218 using various compression and/or encoding methods. In some implementations, online machine issue resolution process 10 pre-processes 110 kernel dump file 218 to a predefined kernel dump size limit. The predefined kernel dump size limit may be user-defined and/or a default size.

In some implementations, pre-processing 110 the kernel dump file includes generating 112 a predefined kernel dump file identifier that is processed by the analysis server to generate the issue resolution notification. For example, suppose agent 212 obtains kernel dump file 218 and, as will be discussed in greater detail below, resolves the issue by implementing issue resolution notification from analysis server 214. In this example, analysis server 214 stores kernel dump file 218 and the associated issue resolution notification in a database for future access and generates 112 a predefined kernel dump file identifier (e.g., predefined kernel dump file identifier 224) with kernel dump file 218. Predefined kernel dump file identifier 224 is an alphanumerical token or combination of tokens used to represent a particular kernel dump file and/or issue resolution notification. In some implementations, the predefined kernel dump file identifier is provided with or otherwise shared with agent 212. Accordingly, when agent 212 encounters the same kernel dump file, agent 212 pre-processes 110 kernel dump file 218 by associating predefined kernel dump file identifier 224 with kernel dump file 218 such that agent 212 uploads kernel dump file 218 to analysis server 214 by uploading predefined kernel dump file identifier 224. In this manner, agent 212 is able to more efficiently (i.e., in terms of time and computing resources required) transmit kernel dump file 218 by using kernel dump file identifier 224 instead of transmitting the entirety of kernel dump file 218.

In some implementations, online machine issue resolution process 10 queues 106 the flagged kernel dump file in a prioritized kernel dump queue. For example, agent processing queue 219 includes a standard kernel dump file queue (e.g., standard kernel dump queue 222) for processing and transmitting kernel dump files and other information from agent 212 to external resources. In one example, agent 212 queues kernel dump files in standard kernel dump queue 222 for processing and transmitting to an analysis server (e.g., analysis server 214). However, the processing of complete kernel dump files using standard kernel dump queue 222 is unable to process kernel dump files associated with particular issues in time to allow for online issue resolution. Accordingly, online machine issue resolution process 10 queues 106 flagged kernel dump file 226 in a prioritized kernel dump queue (e.g., prioritized kernel dump queue 220). Prioritized kernel dump queue 220 is a queue including a predefined storage capacity with prioritized access to the processing resources of agent 212 to expedite the transmission of kernel dump file 218 to analysis server 214. As prioritized kernel dump queue 220 is limited or restricted to flagged kernel dump files, online machine issue resolution process 10 is able to bypass other kernel dump files for uploading to the analysis server.

In some implementations, online machine issue resolution process 10 uploads 108 the flagged kernel dump file from the prioritized kernel dump queue to an analysis server for online resolution. For example, analysis server 214 is a server computing device deployed within cloud computing environment 200 that includes a service or services that monitor the performance of target computing devices deployed within cloud computing environment 200. In some implementations, analysis server 214 processes telemetry data and live kernel dumps (e.g., kernel dump file 218) uploaded from agents associated with target computing devices within cloud computing environment 200 to identify issues from the telemetry data and to generate issue resolution notifications to resolve issues detected by respective agents based on a kernel dump file uploaded from the respective agent. Uploading 108 flagged kernel dump file 226 from prioritized kernel dump queue 220 of agent 212 to analysis server 214 includes establishing a network connection between agent 212 and analysis server 214 and transmitting flagged kernel dump file 226 to analysis server 214.

In some implementations analysis server 214 processes flagged kernel dump file 226 by comparing the contents of flagged kernel dump file 226 to a plurality of issue resolution rules and/or by providing the contents of flagged kernel dump file 226 to an issue resolution system (i.e., a hardware and/or software system that processes content from flagged kernel dump file 226 to a database of issue resolution processes or to a generative artificial intelligence model that operates over the database of issue resolution processes to resolve the issue). In some implementations, analysis server 214 performs expedited processing on flagged kernel dump file 226 in response to identifying the flag in a similar manner as described above relative to agent 212. In this manner, analysis server 214 queues non-flagged kernel dump files for processing and queues flagged kernel dump files for immediate or expedited processing because of the identified flag. In one example, analysis server 214 includes various predefined issue resolution rules that match information from the flagged kernel dump file with issue resolution procedures to mitigate or resolve the issue. In another example, analysis server 214 includes a generative artificial intelligence model that processes flagged kernel dump file 226 as input tokens and outputs an issue resolution process to resolve the issue from a database of issue resolution processes.

In some implementations, the analysis server is a co-regional analysis server located in a same geographic region as the target computing device. For example and as shown in FIG. 2, analysis server 214 is a co-regional analysis server (i.e., an analysis server located in the same physical or geographic region as the target computing device). In this example, by uploading 108 flagged kernel dump file 226 to a co-regional analysis server (e.g., analysis server 214), potential delays associated with transmitting flagged kernel dump file 226 to an analysis server located outside of the same geographic region as target computing device 202.

Referring also to FIG. 3, uploading 108 flagged kernel dump file 226 from prioritized kernel dump queue 220 to analysis server 214 for online resolution includes uploading flagged kernel dump file 226 to one or more intermediary or intervening systems. In some implementations, online machine issue resolution process 10 uploads 108 flagged kernel dump file 226 to a co-regional first issue resolution service (e.g., co-regional first issue resolution service 300) that performs a first portion of issue resolution analysis on flagged kernel dump file 226. In one example, co-regional first issue resolution service 300 analyses log files from flagged kernel dump file 226 and generates a representation of the issue. Co-regional first issue resolution service 300 then uploads these to another intermediary service or to analysis server 214. In one example, co-regional first issue resolution service 300 uploads the generated log files (e.g., log files 302) to a second issue resolution service which performs a second portion of issue resolution analysis on the log files. In this example, the second issue resolution service analyzes the log files and writes a subset of the log files to a notification service which alerts analysis server 214 of the subset of log files to process. In some implementations, performing the second portion of issue resolution analysis includes determining whether flagged kernel dump file 226 is associated with a predefined kernel dump file identifier such that analysis server 214 is provided with a predefined kernel dump file identifier instead of flagged kernel dump file 226 or log files from flagged kernel dump file 226. In this example, analysis server 214 is provided with the predefined kernel dump file identifier for flagged kernel dump file 226.

In some implementations, analysis server 214 processes flagged kernel dump file 226 or a predefined kernel dump file identifier representative of flagged kernel dump file 226. For example, using the content of flagged kernel dump file 226, analysis server 214 applies predefined issue resolution rules that match information from flagged kernel dump file 226 with issue resolution procedures to mitigate or resolve the issue. In another example, analysis server 214 provides the content from flagged kernel dump file 226 as input tokens to a generative artificial intelligence model that outputs an issue resolution process to resolve the issue from a database of issue resolution processes. In some implementations, analysis server 214 generates an issue resolution notification (e.g., issue resolution notification 228) for resolving the issue. Issue resolution notification 228 is a description of the issue resolution procedures or process determined by analysis server 214 for resolving or mitigating the issue detected by agent 212. In one example, issue resolution notification 228 includes the issue resolution procedures from analysis server 214. In another example, issue resolution notification 228 includes a representation (i.e., a symbol or index to a database of issue resolution procedures) from which a particular issue resolution procedure is identified for online resolution (i.e., resolving the issue in near-real time in response to detecting the issue as opposed to offline resolution after demands on the target computing device are removed or delayed).

In some implementations, online machine issue resolution process 10 receives 114 an issue resolution notification from the analysis server at a repair service associated with the target computing device, and performs 116 online resolution on the target computing device by implementing the issue resolution notification on the target computing device using the repair service. For example and as shown in FIGS. 2-3, analysis server 214 transmits issue resolution notification 228 to a repair service (e.g., repair service 230) associated with target computing device 202. Repair service 230 is a hardware and/or software system that interacts with target computing device 202 to implement various repair procedures to configure and maintain target computing device 202 for deploying virtual machines and/or other services within cloud computing environment 200. In some implementations, issue resolution notification 228 describes a root cause for the issue. For example, a root issue cause is a description of the cause of the issue as determined by analysis server 214. With issue resolution notification 228, online machine issue resolution process 10 maps the root issue cause from issue resolution notification 228 to a remedial action for resolving the issue. In some implementations, repair service 230 performs online resolution by implementing remedial actions on target computing device 202 to resolve the issue detected by agent 212. Examples of remedial actions for online resolution of the issue include marking target computing device 202 for technician investigation; holding target computing device 202 in an "unallocatable" state for investigation instead of risking sending target computing device 202 out of production; restarting a suspected driver; restarting dependent processes; and/or migrating the virtual machine or other service from target computing device 202 to a different target computing device.

In some implementations, repair service 230 uses issue resolution notification 228 to map the root issue cause to a most precise remedial action for resolving the issue based upon, at least in part, issue resolution statistics of analysis server 214 and/or repair service 230 (i.e., a most likely remedial action for resolving the issue). For example, repair service 230 implements a remedial action that is disruptive but that is most likely to resolve the issue. In another example, repair service 230 implements a least disruptive remedial action for resolving the issue based upon, at least in part, issue resolution statistics of analysis server 214 and/or repair service 230. For example, repair service 230 implements a remedial action that is the least disruptive option but that has a lower likelihood of resolving the issue. In some implementations, online machine issue resolution process 10 may include various thresholds and/or medical action rules for determining when to implement the least disruptive remedial action, when the remedial action should be the most likely to resolve the issue, and/or when to implement remedial actions with varying levels of disruption and/or likelihoods of resolving the issue.

In some implementations, performing 116 online resolution includes one or more of: implementing 118 a least disruptive remedial action from a plurality of remedial actions associated with the root issue cause from the issue resolution notification; and implementing 120 a most precise remedial action associated with the root issue cause from the issue resolution notification. For example and in some implementations, issue resolution notification 228 includes a plurality of remedial actions for resolving or mitigating the issue detected by agent 212. In this example, online machine issue resolution process 10 (using repair service 230) determines a least disruptive remedial action from the plurality of remedial actions to implement 118 on target computing device 202. In one example, online machine issue resolution process 10 may iterate through multiple remedial actions beginning with the least disruptive remedial action to a most disruptive remedial action until the issue is resolved, or the target computing device is removed from service and, therefore, requiring offline resolution. In another example, online machine issue resolution process 10 (using repair service 230) determines a most precise remedial action from the plurality of remedial actions to implement 120 on target computing device 202, where the most precise remedial action is defined based upon, at least in part, issue resolution statistics of analysis server 214 and/or repair service 230.

In this manner, online machine issue resolution process 10 enables online resolution of issues on target computing device 202 by detecting 100 issues using agent 212, initiating the generation of kernel dump file 218 from target computing device 202, flagging kernel dump file 218 and queuing 106 the processing of kernel dump file by queuing kernel dump file 218 in prioritized kernel dump queue 220, uploading 108 flagged kernel dump file to analysis server 214, receiving 114 issue resolution notification 228 and performing 116 online resolution using repair service 230. Accordingly, the time required to resolve issues in cloud computing environment 200 that concern the operation of virtual machines 204, 206 on target computing device 202 is significantly reduced.

Figure 4:
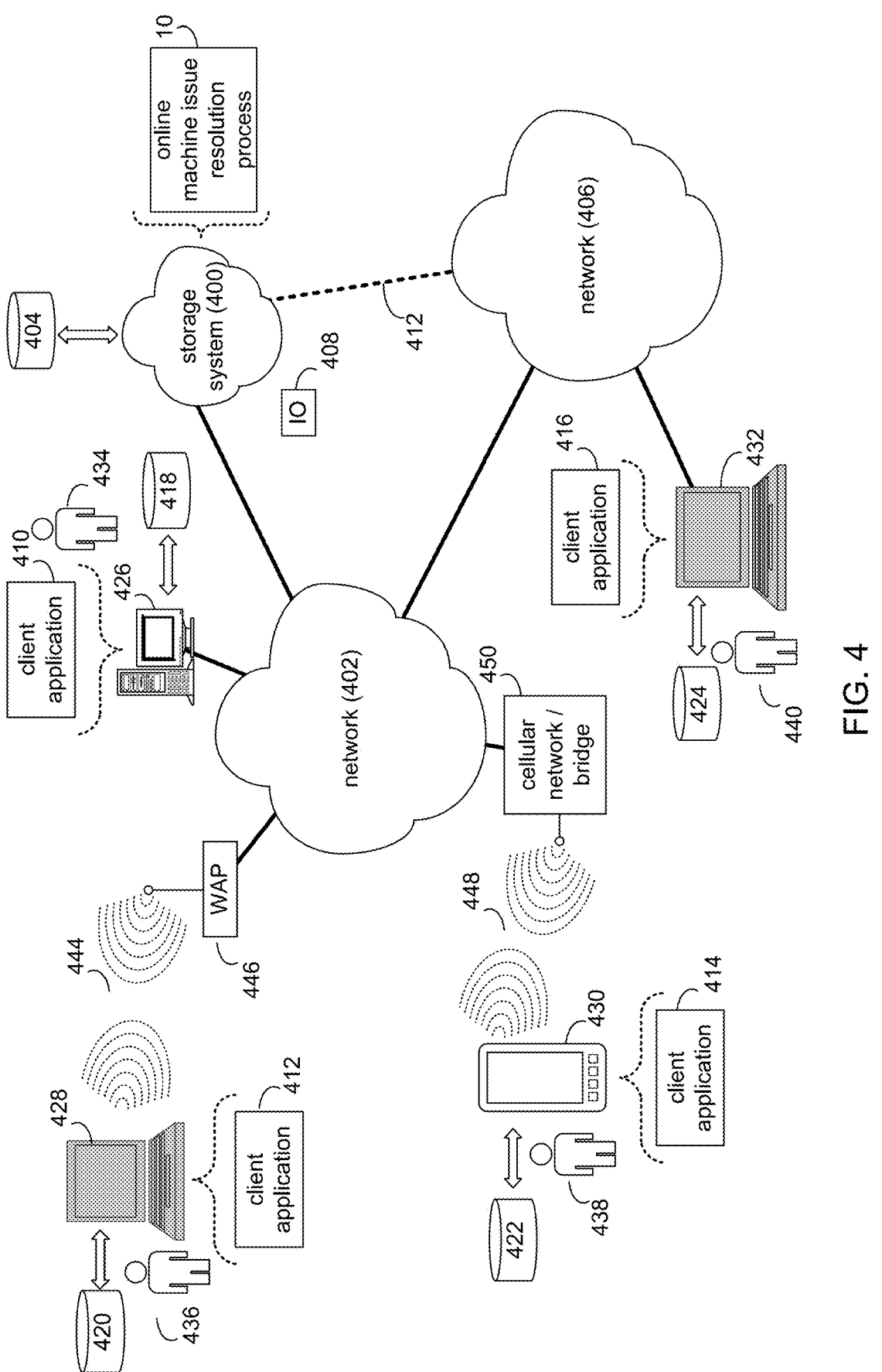
FIG. 4 is a diagrammatic view of computer system and the online machine issue resolution process coupled to a distributed computing network.

System Overview:

Referring to FIG. 4, an online machine issue resolution process 10 is shown to reside on and is executed by storage system 400, which is connected to network 402 (e.g., the Internet or a local area network). Examples of storage system 400 include: a Network Attached Storage (NAS) system, a Storage Area Network (SAN), a personal computer with a memory system, a server computer with a memory system, and a cloud-based device with a memory system. A SAN includes one or more of a personal computer, a server computer, a series of server computers, a minicomputer, a mainframe computer, a RAID device, and a NAS system.

The various components of storage system 400 execute one or more operating systems, examples of which include: Microsoft® Windows®; Mac® OS X®; Red Hat® Linux®, Windows® Mobile, Chrome OS, Blackberry OS, Fire OS, or a custom operating system (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of online machine issue resolution process 10, which are stored on storage device 404 included within storage system 400, are executed by one or more processors (not shown) and one or more memory architectures (not shown) included within storage system 400. Storage device 404 may include: a hard disk drive; an optical drive; a RAID device; a random-access memory (RAM); a read-only memory (ROM); and all forms of flash memory storage devices. Additionally or alternatively, some portions of the instruction sets and subroutines of online machine issue resolution process 10 are stored on storage devices (and/or executed by processors and memory architectures) that are external to storage system 400.

In some implementations, network 402 is connected to one or more secondary networks (e.g., network 406), examples of which include: a local area network; a wide area network; or an intranet.

Various input/output (IO) requests (e.g., IO request 408) are sent from client applications 410, 412, 414, 416 to storage system 400. Examples of IO request 408 include data write requests (e.g., a request that content be written to storage system 400) and data read requests (e.g., a request that content be read from storage system 400).

The instruction sets and subroutines of client applications 410, 412, 414, 416, which may be stored on storage devices 418, 420, 422, 424 (respectively) coupled to client electronic devices 426, 428, 430, 432 (respectively), may be executed by one or more processors (not shown) and one or more memory architectures (not shown) incorporated into client electronic devices 426, 428, 430, 432 (respectively). Storage devices 418, 420, 422, 424 may include: hard disk drives; tape drives; optical drives; RAID devices; random access memories (RAM); read-only memories (ROM), and all forms of flash memory storage devices. Examples of client electronic devices 426, 428, 430, 432 include personal computer 426, laptop computer 428, smartphone 430, laptop computer 432, a server (not shown), a data-enabled, and a dedicated network device (not shown). Client electronic devices 426, 428, 430, 432 each execute an operating system.

Users 434, 436, 438, 440 may access storage system 400 directly through network 402 or through secondary network 406. Further, storage system 400 may be connected to network 402 through secondary network 406, as illustrated with link line 442.

The various client electronic devices may be directly or indirectly coupled to network 402 (or network 406). For example, personal computer 426 is shown directly coupled to network 402 via a hardwired network connection. Further, laptop computer 432 is shown directly coupled to network 406 via a hardwired network connection. Laptop computer 428 is shown wirelessly coupled to network 402 via wireless communication channel 444 established between laptop computer 428 and wireless access point (e.g., WAP) 446, which is shown directly coupled to network 402. WAP 446 may be, for example, an IEEE 802.11a, 802.11b, 802.11g, 802.11n, Wi-Fi®, and/or Bluetooth® device that is capable of establishing a wireless communication channel 444 between laptop computer 428 and WAP 446. Smartphone 430 is shown wirelessly coupled to network 402 via wireless communication channel 448 established between smartphone 430 and cellular network/bridge 450, which is shown directly coupled to network 402.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    detecting an issue associated with a target computing device;
    obtaining a kernel dump file from the target computing device in response to initiating a kernel dump from the target computing device based on the issue associated with the target computing device;
    generating a flagged kernel dump file by flagging the kernel dump file for prioritized processing;
    pre-processing, using an agent in communication with the target computing device, the flagged kernel dump file to reduce a size of the flagged kernel dump file;
    queuing the flagged kernel dump file in a prioritized kernel dump queue; and
    uploading the flagged kernel dump file having the reduced size from the prioritized kernel dump queue to an analysis server for online resolution.

2. The computer-implemented method of claim 1, wherein the analysis server is a co-regional analysis server located in a same geographic region as the target computing device.

3. The computer-implemented method of claim 1, wherein the issue includes an issue associated with a virtual machine deployed on the target computing device within a cloud computing environment.

4. The computer-implemented method of claim 1, further comprising:
    receiving an issue resolution notification from the analysis server at a repair service associated with the target computing device; and
    performing online resolution on the target computing device by mapping a root issue cause from the issue resolution notification to a remedial action using the repair service.

5. The computer-implemented method of claim 4, wherein the issue resolution notification is generated by the analysis server in response to the analysis server processing the flagged kernel dump file using the analysis server.

6. The computer-implemented method of claim 4, wherein performing online resolution includes one or more of:
    implementing a least disruptive remedial action from a plurality of remedial actions associated with the issue resolution notification; and

implementing a most precise remedial action from the plurality of remedial actions associated with the issue resolution notification.

7. The computer-implemented method of claim 4, wherein pre-processing the kernel dump file includes generating a predefined kernel dump file identifier that is processed by the analysis server to generate the issue resolution notification.

8. A computing system comprising:

a memory; and a processor operatively coupled to the memory, the processor configured to:

detect an issue associated with a target computing device, obtain a kernel dump file from the target computing device in response to initiating a kernel dump from the target computing device based on the issue associated with the target computing device, generate a flagged kernel dump file by flagging the kernel dump file for prioritized processing, pre-process, using an agent in communication with the target computing device, the flagged kernel dump file to reduce a size of the flagged kernel dump file;

queue the flagged kernel dump file in a prioritized kernel dump queue, upload the flagged kernel dump file having the reduced size from the prioritized kernel dump queue to an analysis server for online resolution, receive an issue resolution notification from the analysis server at a repair service associated with the target computing device, and perform online resolution on the target computing device by implementing a remedial action associated with the issue resolution notification on the target computing device using the repair service.

9. The computing system of claim 8, wherein the analysis server is a co-regional analysis server located in a same geographic region as the target computing device.

10. The computing system of claim 8, wherein the issue includes an issue associated with a virtual machine deployed on the target computing device within a cloud computing environment.

11. The computing system of claim 8, wherein the processor is further configured to:

receive an issue resolution notification from the analysis server at a repair service associated with the target computing device; and perform online resolution on the target computing device by mapping a root issue cause from the issue resolution notification to a remedial action using the repair service.

12. The computing system of claim 11, wherein to perform online resolution the processor is further configured to:

implement a least disruptive remedial action from a plurality of remedial actions associated with the issue resolution notification; and implement a most precise remedial action from the plurality of remedial actions associated with the issue resolution notification.

13. The computing system of claim 8, wherein pre-processing the kernel dump file includes generating a predefined kernel dump file identifier that is processed by the analysis server to generate the issue resolution notification.

14. A non-transitory computer readable medium having instructions stored thereon which, when executed by a processor, cause the processor to:

detect an issue associated with a target computing device, wherein the issue is associated with a virtual machine deployed on the target computing device within a cloud computing environment;

obtain a kernel dump file from the target computing device in response to initiating a kernel dump from the target computing device based on the issue associated with the target computing device;

generate a flagged kernel dump file by flagging the kernel dump file for prioritized processing;

pre-process, using an agent in communication with the target computing device, the flagged kernel dump file to reduce a size of the flagged kernel dump file;

queue the flagged kernel dump file in a prioritized kernel dump queue;

upload the flagged kernel dump file having the reduced size from the prioritized kernel dump queue to an analysis server for online resolution;

receive an issue resolution notification from the analysis server at a repair service associated with the target computing device; and perform online resolution on the target computing device by implementing the issue resolution notification on the target computing device using the repair service.

15. The non-transitory computer readable medium of claim 14, wherein the analysis server is a co-regional analysis server located in a same geographic region as the target computing device.

16. The non-transitory computer readable medium of claim 14, wherein to perform online resolution the processor is to:

implement a least disruptive remedial action from a plurality of remedial actions associated with the issue resolution notification.

17. The non-transitory computer readable medium of claim 14, wherein to pre-process the kernel dump file the processor is further to generate a predefined kernel dump file identifier that is processed by the analysis server to generate the issue resolution notification.

* * * * *